(12) United States Patent
Green et al.

(10) Patent No.: US 8,966,601 B2
(45) Date of Patent: Feb. 24, 2015

(54) CONNECTION OF PERIPHERAL DEVICES TO WIRELESS NETWORKS

(75) Inventors: Brett A Green, Eagle, ID (US); Eric Thomas Stucki, Meridian, ID (US); Denis Pochuev, San Francisco, CA (US); Jim T. Belesiu, Lake Oswego, OR (US); Lawrence S Canino, Jr., San Diego, CA (US); Michael Stewart, Gresham, OR (US); David O Hamilton, Ramona, CA (US); Gregory P Kuziej, San Diego, CA (US); Cameron E Light, Escondido, CA (US); Randy Ingram, Battle Ground, WA (US); Tony Blasio, San Diego, CA (US); Steve T Breidenbach, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 460 days.

(21) Appl. No.: 13/271,067

(22) Filed: Oct. 11, 2011

(65) Prior Publication Data
US 2013/0081121 A1    Mar. 28, 2013

Related U.S. Application Data

(60) Provisional application No. 61/536,587, filed on Sep. 23, 2011.

(51) Int. Cl.
| | |
|---|---|
| *H04L 9/08* | (2006.01) |
| *H04W 12/04* | (2009.01) |
| *H04W 84/12* | (2009.01) |

(52) U.S. Cl.
CPC ............. *H04W 12/04* (2013.01); *H04L 9/0827* (2013.01); *H04W 84/12* (2013.01); *H04L 2209/80* (2013.01)
USPC ................ 726/7; 380/270; 455/411; 455/410

(58) Field of Classification Search
USPC .......... 726/7, 19; 380/277, 270; 455/411, 410
See application file for complete search history.

(56) References Cited

U.S. PATENT DOCUMENTS

| | | | |
|---|---|---|---|
| 7,306,153 B2 | 12/2007 | Chong et al. | |
| 7,616,594 B2 | 11/2009 | Roberts et al. | |

(Continued)

FOREIGN PATENT DOCUMENTS

| | | |
|---|---|---|
| WO | WO-02060204 | 8/2002 |
| WO | WO-2010098749 | 9/2010 |
| WO | WO-2012151486 A2 | 11/2012 |

OTHER PUBLICATIONS

Apple, "Wi-Fi base stations: Setting up and configuring an extended wireless network (802.11n)," Feb. 9, 2011, <http://support.apple.com/kb/ht4259>.

(Continued)

*Primary Examiner* — Amare F Tabor
(74) *Attorney, Agent, or Firm* — Hewlett-Packard Patent Department

(57) ABSTRACT

Methods and an apparatus to connect a peripheral device to a wireless network access point are provided herein. A host device associated with a wireless network access point stores and obtains a set of wireless credentials related to a wireless network formed by the wireless network access point. The host device opens a connection between the host device and the peripheral device to transmit the set of wireless credentials from the host device to the peripheral device. The host device identifies the peripheral device over the wireless network access point.

20 Claims, 9 Drawing Sheets

(56) References Cited

U.S. PATENT DOCUMENTS

| | | | |
|---|---|---|---|
| 7,710,587 B2 * | 5/2010 | Crosier et al. | 358/1.15 |
| 7,940,732 B2 | 5/2011 | Lowry et al. | |
| 8,079,073 B2 * | 12/2011 | Roberts | 726/11 |
| 8,305,604 B2 | 11/2012 | McIntyre | |
| 8,539,047 B2 * | 9/2013 | McNulty | 709/220 |
| 8,542,833 B2 * | 9/2013 | Devol et al. | 380/259 |
| 2004/0116109 A1 | 6/2004 | Gibbs et al. | |
| 2006/0067295 A1 | 3/2006 | Lehotsky et al. | |
| 2006/0105714 A1 | 5/2006 | Hall et al. | |
| 2009/0125713 A1 | 5/2009 | Karschnia et al. | |
| 2010/0024003 A1 * | 1/2010 | Malledant et al. | 726/3 |
| 2010/0115108 A1 | 5/2010 | Wang et al. | |
| 2010/0182633 A1 | 7/2010 | Wu et al. | |
| 2013/0014232 A1 | 1/2013 | Louboutin et al. | |
| 2013/0081121 A1 | 3/2013 | Green et al. | |
| 2013/0321856 A1 | 12/2013 | Bell et al. | |

OTHER PUBLICATIONS

Brother, "How do I configure the wireless printer using a USB or Ethernet cable and install the printer driver in Windows?," May 29, 2011, <http:// www.brother-/usa.com/ Virdata/ SAPHTMLEditorFiles/ 4CFB202FCC49539EE1000000CD8620C6.AM/DESKTOP/ BLL%20FDD%20WIRELESS%20SETUP%20V2%20-%20CABLE.PDF>.

Jerremy-Tamlin, "HowTo: Configure Wireless for HP Deskjet 3050 ALL-IN-ONE J610a on Ubuntu 10.04," ubuntu forums, thread, May 31, 2011, <http://ubuntuforums.org/showthread.php?t=1772198>.

Kodak, "Networking Your Printer," KODAK ESP Office 6100 Series All-in-One Printer—Extended User Guide, Nov. 28, 2010, <http://web.archive.org/web/20101128114454/http://resources.kodak.com/support/shtml/en/manuals/urg01110/urg01110c2s1.shtml>.

Lexmark, "How to Access the Printer's Web Page or Embedded Web Server; A Communication Test and a Brief Description of Settings," Dec. 4, 2010, <http://support.lexmark.com/index?pmv=print&page=content&locale=en&userlocale=EN_US&id=HO3373>.

Sam Costello, "How to Set Up Apple Airport Express," About.com, Jan. 28, 2009, <http://ipod.about.com/od/usingairportexpress/ss/airport-express.htm>.

Electronics For Imaging, "PrintMe Mobile Administrator's Guide, version 2.3," Aug. 27, 2012, 25 pages, available at: http://w3.efi.com/~/ media/Files/EFI/printme-mobile/InstallationSetupGuide23.pdf.

* cited by examiner

CONNECTION OF PERIPHERAL DEVICES TO WIRELESS NETWORKS

CROSS-REFERENCE TO RELATED APPLICATION

This application claims priority to provisional patent application Ser. No. 61/538,587 (HP REF 82750782), entitled "CONNECTION OF PERIPHERAL DEVICES TO WIRELESS NETWORKS," filed Sep. 23, 2011 by Brett Green, et al., the contents of which is incorporated herein by reference in its entirety.

BACKGROUND

Peripheral devices are devices that are not part of a computing device, such as a computer, but are more or less dependent on the computing device. Peripheral devices are connected to wireless networks to allow interaction between the peripheral devices and computing devices without a physical connection, such as via a universal serial bus (USB) cable, therebetween.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

In the following detailed description, reference is made to the accompanying drawings which form a part hereof, and in which is illustrated by way of specific examples in which the present disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims.

Peripheral devices are connected to wireless networks via wireless network access points. To set-up the peripheral device on the wireless network, information about the wireless network access point is inputted into the peripheral device. This information includes, for example, a service set identifier (SSID), an encryption type, and a network password. Oftentimes, peripheral devices have no convenient method for entering the information about the wireless network access point directly.

The set-up of peripheral devices is performed by the user either connecting each peripheral device to a host device via a cable, such as an USB cable, or manually entering the information about the wireless network access point into the peripheral device. Using a cable may be inconvenient as, the user intends to use the peripheral device wirelessly. Requiring the user to enter the information about the wireless network access point makes the set-up of peripheral devices inconvenient and difficult, as the user must first obtain the information and then accurately provide it to the peripheral device.

In examples, methods and an apparatus to connect a peripheral device to a wireless network access point are provided. A host device already associated with a wireless network access point stores and obtains a set of wireless credentials related to a wireless network access point. The host device opens a direct connection between the host device and the peripheral device to transmit the set of wireless credentials from the host device to the peripheral device. The set of wireless credentials are used by the peripheral device to set-up the wireless network connection. The host device identifies the peripheral device over the wireless network access point. The process is automated and does not use a cable between the host device and the peripheral device or require manual entry of the wireless credentials by a user on the peripheral device.

Figure 1:
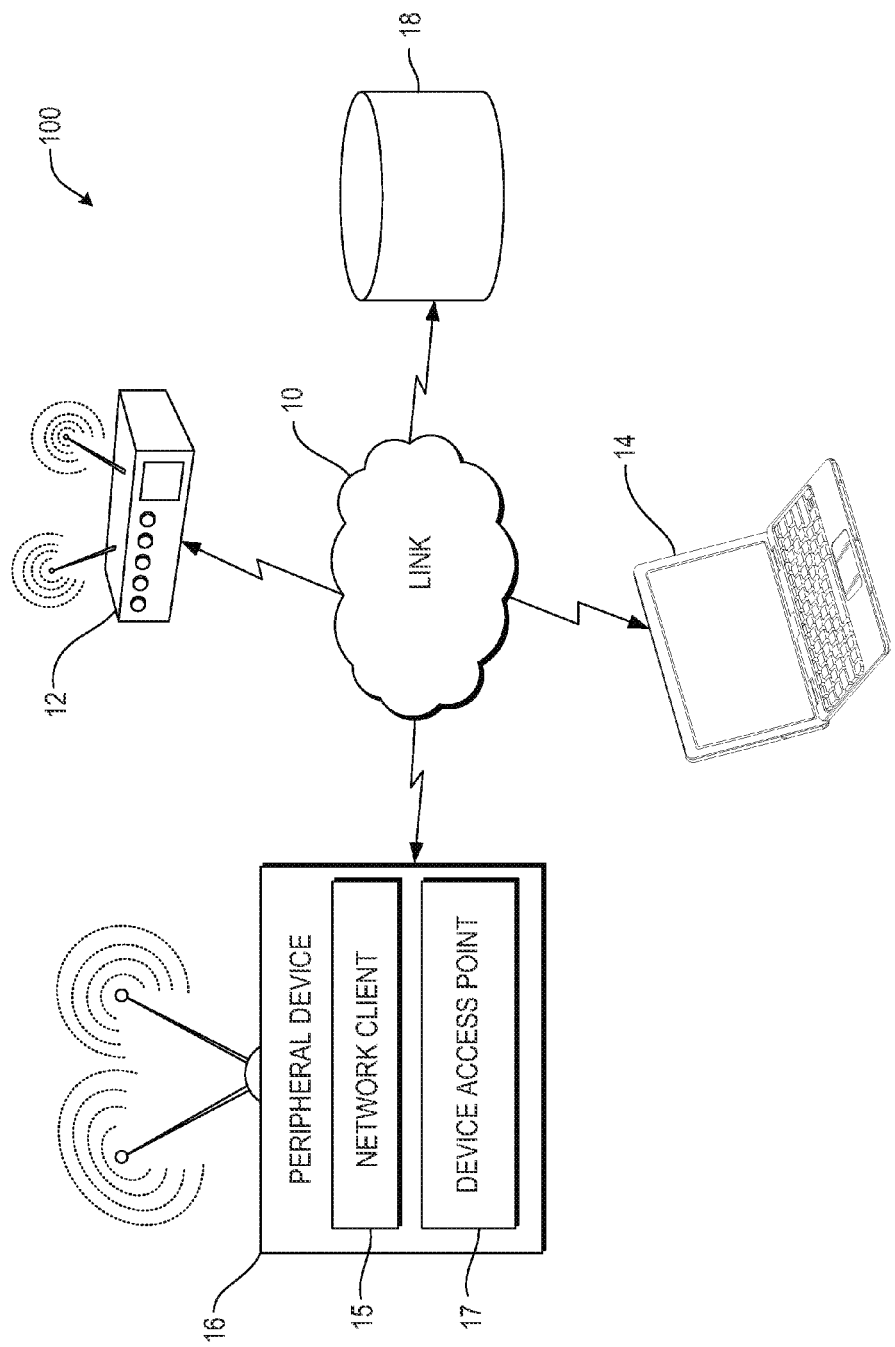
FIG. 1 illustrates a schematic diagram of a system to connect a peripheral device to a wireless access point according to an example.

FIG. 1 illustrates a schematic diagram of a system 100 to connect a peripheral device to a wireless network access point according to an example. The system 100 includes a link 10 that connects a wireless network access point 12, a host device 14, a peripheral device 16, and a data store 18.

The wireless network access point 12 represents generally any combination of hardware and/or software that connects a network. For example, the wireless network access point 12 may be a router connected to a cable modem that connects the host device 14 to the internet, and/or an access point that creates a local area network. The wireless network access point 12 creates a wireless network between the wireless network access point 12 and connected devices via the link 10. The devices illustrated include the host device 14, peripheral device 16, a data store 18, but may include further components.

The host device 14 represents generally any computing device or combination of computing devices configured to communicate with a peripheral device 16 over a wireless network. The host device 14 is connected to the wireless network access point 12 as, for example a dynamic host configuration protocol (DHCP) client of the router or a static internet protocol (IP) address client. The host device 14 also checks for pre-conditions as provided by a set of instructions. The host device 14 may, for example, run a set of instructions that when executed by a processor install software, such as device drivers for a peripheral device 16, and obtain information for a wireless connection, such as wireless credentials. The set of instructions may also connect the peripheral device 16 to the wireless network access point 12, such as via the link 10.

The peripheral device 16 represents a device that is not part of the host device 14 and is more or less dependent on the host device 14. For example, the peripheral device 16 may expand the host device's 14 capability, while not forming part of the core architecture of the host device 14. Examples of peripheral devices 16 include printers, image scanners, multifunction devices, tape drives, microphones, loudspeakers, webcams, digital cameras, game systems, mobile devices, and mass storage devices, such as network hard drives.

The peripheral device 16 provided herein interacts with the host device 14 via the link 10. The peripheral device 16 receives the wireless credentials from the host device 14 and uses the wireless credentials to automatically configure the peripheral device 16 to connect to a wireless network via the wireless access point 12. The peripheral device 16 interacts with the host device using a wireless radio having dual network capabilities including a network client 15, such as a STAtion, and a device access point 17. The device access point 17 may include a "micro" access point that allows creation of a temporary infrastructure-type network connection. The network STAtion allows creation of a temporary wireless ad hoc peer-to-peer connection. Regardless of the type of temporary connection, the interaction may include transmission of network information for initial set-up via a temporary network connection to transmit data needed to automatically connect the peripheral device 16 to a wireless network access point 12.

For example, the temporary network connection may be an ad hoc network connection or a temporary infrastructure-type network connection between host device 16 and the device access point 17. The peripheral device 16 uses the network information and/or data transmitted between the host device 14 and the peripheral device 16 to connect the peripheral device 16 to the network. The peripheral device 16 may receive wireless credentials from the host device 14, and automatically enter the wireless credentials to connect the peripheral device 16 to the wireless network.

A set of instructions may be stored in the data store 18. The data store 18 represents generally any memory configured to store data that can be accessed via the link 10, such as by the host device 14 and/or the peripheral device 16 in the performance of its function. The host device 14 functionalities may be accomplished via the link 10 that connects the host device 14 to the data store 18 that stores, for example, the set of instructions to connect the peripheral device 16 to the wireless network access point 12. The data store 18 is physically located on the host device 14 and/or on a separate device connected to the host device 14 via the link 10, such as a database on a server, a disc insertable into the host device 14.

Link 10 represents generally one or more of a cable, wireless, fiber optic, local, or remote connections via a telecommunication link, an infrared link, a radio frequency link, or any other connectors or systems that provide electronic communication. Link 10 may include, at least in part, an intranet, the Internet, or a combination of both. Link 10 may also include intermediate proxies, routers, switches, load balancers, and the like.

Figure 2:
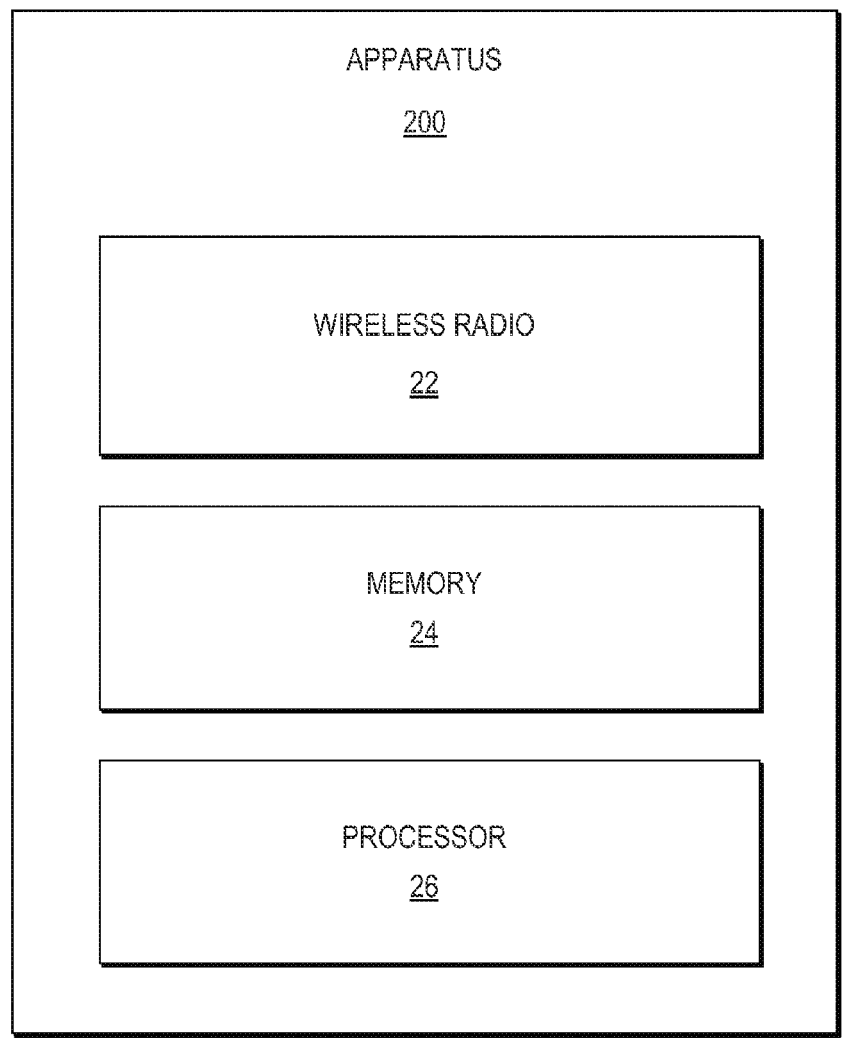
FIG. 2 illustrates a block diagram of an apparatus according to an example.

FIG. 2 illustrates a block diagram of an apparatus 200 to connect a peripheral device 16 to a wireless network access point 12. Referring to FIG. 2, the apparatus 200 may be part of the host device 14 of FIG. 1, which includes a wireless radio 22, a memory 24, and a processor 26. The wireless radio 22 is on and/or connected to a host device 14 and is connectable to the wireless network access point 12 and the peripheral device 16 via the link 10. The wireless radio 22 includes a device that transmits and/or receives radio communication signals to and/or from, for example IEEE 802.11 Wi-Fi™ radio systems. The wireless radio 22 is connectable to the wireless network access point 12 and the peripheral device 16, such as to provide a connection between the host device 14 and the wireless network access point 12 and/or the peripheral device 16.

The memory 24 stores a set of instructions that are executed by the processor 26. The memory 24 may also store data resulting from the execution of the set of instructions, such as wireless credentials as will be discussed further below. The processor 26 is coupled to the wireless radio 22 and the memory 24, such that the execution of the instructions by the processor causes the processor 26 to obtain the set of wireless credentials (or wireless credentials) from a host device 14 associated with the wireless network access point 12 and configure the wireless radio 22 to connect the host device 14 to the peripheral device 16.

After the wireless credentials are obtained from the host device 14, a connection is opened between the host device 14 and the peripheral device 16. The connection may be formed by connecting the wireless radio 22 of the host device 14 to the device access point 17 (or ad hoc connection via the device STAtion). Once the wireless radio 22 is connected to the peripheral device 16, the execution of the instructions by the processor 26 causes the host device 14 to transmit the wireless credentials to the peripheral device 16. The connection between the host device 14 and the device access point 17 may be considered a temporary connection for purposes of transmitting data, such as data related to the wireless credentials needed to establish a network connection therebetween. The connection between the host device 14 and the peripheral device 16 via the device access point 17 may be closed after the wireless credentials and/or additional data is transmitted therebetween.

For example, the host device 14 is usually disconnected from the peripheral device 16 after the transmission of the wireless credentials. The processer 26 may then execute instructions to configure the wireless radio 22 to reconnect the host device 14 to the wireless network access point 12. The peripheral device 16 configures the wireless settings, joins the network formed by wireless network access point 12, and is identifiable over the wireless network access point 12. The configuration of the wireless settings may include providing the wireless credentials and additional data to the peripheral device 16 to facilitate automatic set-up of the peripheral device 16 to the wireless network access point 12. In other words, automatic set-up of the peripheral device 16 includes connecting the peripheral device 16 to the wireless network access point 12 without a cable and without a user manually entering the wireless credentials.

After the wireless credentials are transmitted to the peripheral device 16, the peripheral device 16 is configured to automatically connect to the network. For example, the peripheral device 16 may receive wireless credentials from the host device 14, and automatically enter the wireless credentials to connect the peripheral device 16 to the wireless network formed by the wireless network access point 12. The peripheral device 16 may be identified by the host device 14 and/or other devices connected to the wireless network access point 12. The instructions may also cause the processor 26 of the host device 14 to perform a scan to find the peripheral device 16 over the wireless network access point 12 and receive a peripheral device identifier, such as an internet protocol address or other unique identifier of the peripheral device 16 therefrom. For example, the host device 14 may receive a peripheral device identifier, and the host device 14 may then map or match the peripheral device identifier to the internet protocol address.

Figure 3:
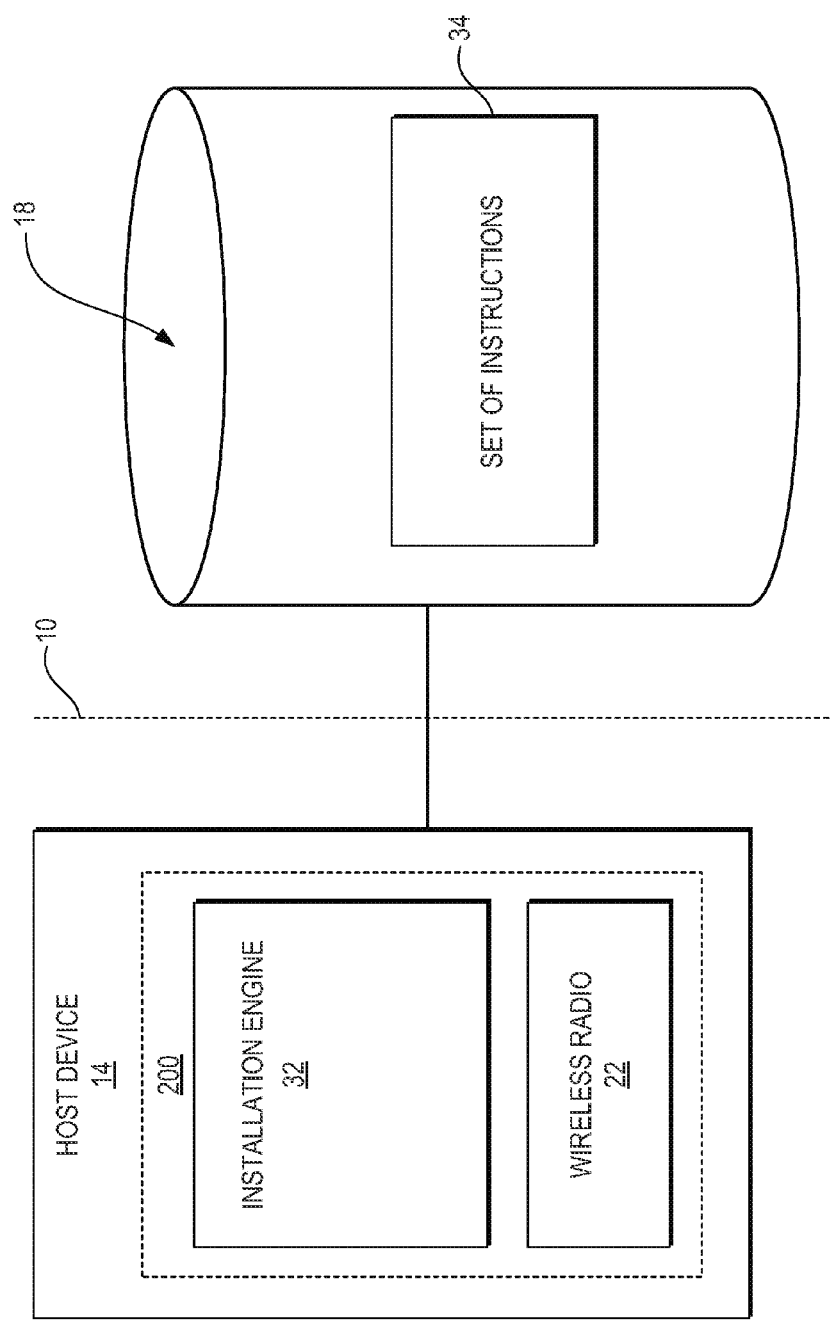
FIG. 3 illustrates a block diagram of a portion of the system of FIG. 1 according to an example.

Referring to FIG. 3 a block diagram of a portion of the system 100 of FIG. 1 is illustrated according to an example.

The block diagram illustrates the link 10 connecting the host device 14 to the data store 18. The host device 14 includes at least the apparatus of FIG. 2 and may include further components. For example, the host device 14 includes the wireless radio 22 and an installation engine 32.

As discussed with reference to FIG. 2, the wireless radio 22 is on and/or connected to a host device 14, such as a device that receives radio communication signals from a Wi-Fi™ radio system. The wireless radio 22 is a device that interacts with the host device 14 and connects to the device access point 17 of the peripheral device 16 to transmit wireless credentials thereto. The wireless radio 22 also connects and/or disconnects the host device 14 to and/or from the wireless network access point 12.

The installation engine 32 represents generally any combination of hardware and/or programming to connect the peripheral device 16 to the wireless network access point 12 through the host device 14. The installation engine 32 may include, for example the memory 24 and the processor 26, as illustrated and described in FIG. 2. The installation engine 32 is further described below in FIG. 4.

The data store 18 may include a set of instructions 34 to connect the peripheral device 16 to the wireless network access point 12 through the host device 14. The set of instructions 34 may be stored in a data store 18, such as a database external to the host device 14, a disc, and/or a data storage device on the host device 14, such as the memory 24.

Figure 4:
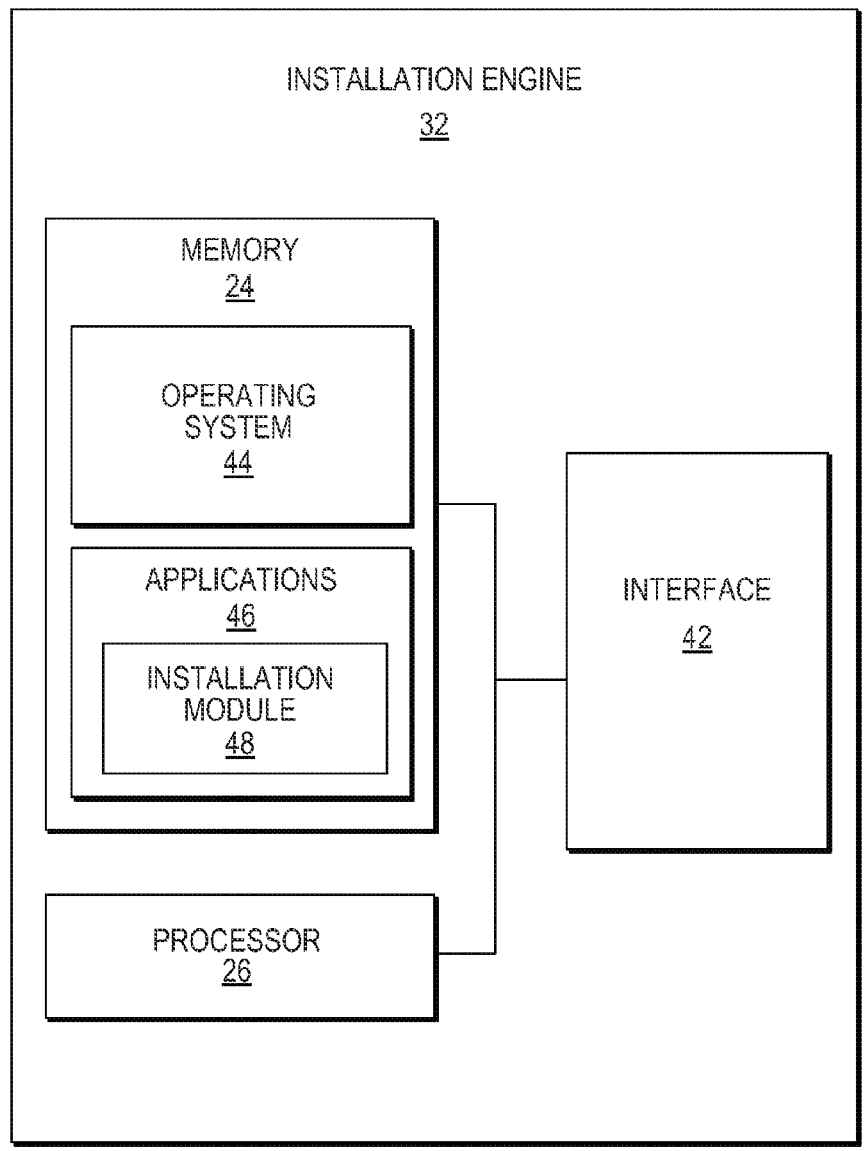
FIG. 4 illustrates a block diagram of a computer readable medium useable with the system of FIG. 1 according to an example.

Referring FIG. 4, a block diagram of an example of the installation engine 32 including a computer readable medium useable with the system of FIG. 1, is illustrated. The installation engine 32 represents generally any combination of hardware and/or software to connect the peripheral device 16 to the wireless network access point 12. For example, the installation engine 32 in FIG. 4 includes the memory 24 to store a set of instructions 34, the processor 26 to execute the set of instructions 34, and an interface 40. The processor 26 represents generally any processor configured to execute program instructions stored in memory 24 to perform various specified functions. The interface 42 represents generally any interface on the host device 14 that is connected to the system 100 of FIG. 1 via the link 10.

The memory 24 is illustrated to include an operating system 44 and applications 46. The operating system 44 represents a collection of programs that when executed by the processor 26 serve as a platform on which applications 46 may run. Examples of operating systems 44 include various versions of Microsoft's Windows®, Apple's Mac OS®, Apple's iOS® (trademark licensed from Cisco), and Google's Android™. The operating system 44 saves the wireless credentials between the host device 14 and the access point 12. The set of instructions 34 cause the processor to obtain the wireless credentials from the operating system 44. Not all operating systems save the wireless credentials such that the wireless credentials are accessible by the installation engine 32, for example, the host device 14 with versions of Windows XP® XP Service Pack 3 or later and Mac OS X® version 10.5 or later save the wireless credentials. Moreover, the set of instructions 34 work when the operating system 44 is in control of the wireless adapter and there is a saved profile for the network infrastructure settings of the wireless network access point 12 that the host device 14 is currently connected to. Examples of the network infrastructure settings of the wireless network access point 12 that the set of instructions 34 work with include 2.4 GHz and 5 GHz.

Applications 46 represent program instructions that when executed by the processor 26 functions as an application, such as installation software that connect the peripheral device 16 to the wireless network access point 12. The executable program instructions stored in memory 24 are illustrated as including an installation module 48. The installation module 48 represents program instructions that when executed by a processor cause the implementation of the installation engine 32. The executable instructions stored in the installation module 48 may include the set of instructions 34 from the database 18 (FIG. 3). In response to the installation software being loaded, the installation module 48 provides instructions to the processor 26. The processor executes the instructions to obtain the wireless credentials, open a connection and transmit the wireless credentials between the peripheral device 16 and the host device 14, and identify the peripheral device 16 over the wireless network access point 12.

Referring to FIGS. 3-4, the installation engine 32 is described as combinations of hardware and/or programming. The hardware portions may include the processor 26. The programming portions may include the operating system 44, applications 46, and/or combinations thereof. The programming may be processor executable instructions stored on a tangible memory media and the hardware may include a processor 26 to execute the instructions. The memory 24 may store program instructions that when executed by the processor 26 cause the processor to perform the program instructions. The memory 24 may be integrated in the same device as the processor 26 or it may be separate but accessible to that device and processor 26.

In some examples, the program instructions may be part of installation software that can be executed by the processor 26 to perform a method using the system 100. The memory 24 may be a portable medium such as a CD, DVD, or flash drive or a memory maintained by a server from which the installation software can be downloaded and installed. In other examples, the program instructions may be part of an application or applications already installed, for example printer drivers installed on the host device 14. In further examples, the memory 24 may include integrated memory such as a hard drive.

Figure 5:
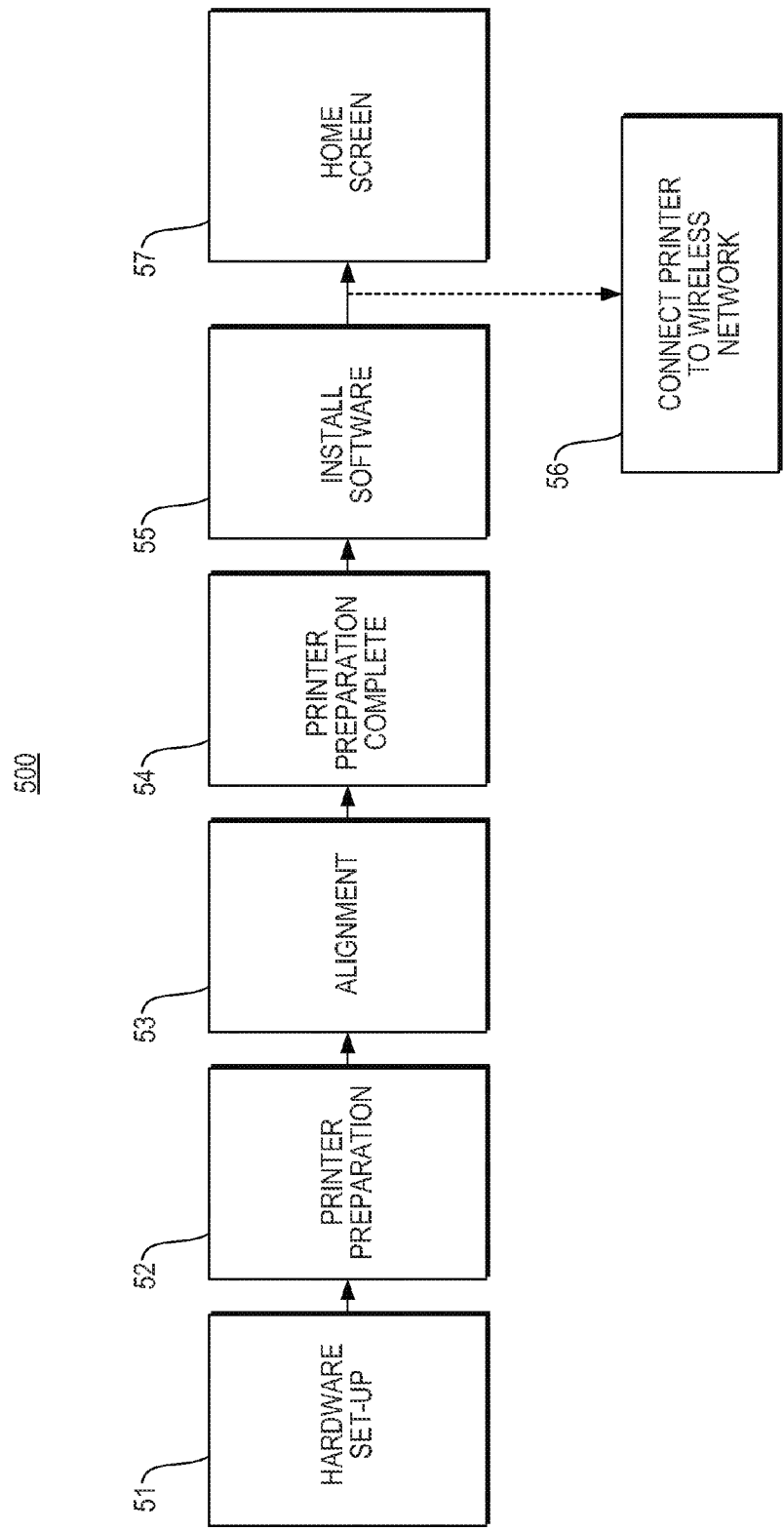
FIG. 5 illustrates a flow chart of the initial set-up of a peripheral device according to an example.

FIG. 5 illustrates a flow chart 500 of an initial set-up of a peripheral device 16 according to an example. Referring to FIG. 5, the peripheral device 16 is a printer and the blocks illustrate the set-up as visible by a user, such as notifications of set-up progress that is displayed on a printer. The set-up occurs when the peripheral device 16, such as a printer, has not yet been connected to the wireless network access point 12 and the peripheral device 16 is broadcasting a special SSID via the device access point 17, such as a printer indicating the peripheral device 16 is not configured, with an ability to perform automatic wireless network set-up. Moreover, the host device 14 may prevent the automated set-up when, for example pre-conditions of the setoff instructions are not met, such as failure to approve the host device 14 to obtain the wireless credentials and/or the set-up of the operating system and/or wireless network does not meet a set of minimum requirements.

To automate the set-up and not require either a cable connection or manual entry of wireless credentials by a user, the peripheral device to be configured must be able to be uniquely identified and addressed. For example, when there is only one special SSID broadcast within the range of the host device 14 that indicates the peripheral device 16 is not configured and has the installation software that matches the peripheral device 16. In this case, the software may automatically select the special SSID associated with the uniquely identified and addressed peripheral device 16. However, when there are multiple special SSIDs detected within the broadcast range of the host device 14, the installation software may provide a user interface to enable the user to select the special SSID associated with the peripheral device 16 that should be selected. The user interface may be, for example a drop down menu or a pop-up window with a menu.

The set-up begins with hardware set-up at block 51. The hardware set-up may include, for example, setting the language, country, loading paper, and/or loading print cartridges for the printer. Block 52 illustrates the printer preparation, such as priming of the printer ink or toner delivery system. The printer alignment is performed in block 53 using, for example, a semi-automated print head alignment method. A notification is displayed in block 54 indicating that the printer preparation is complete. A notification to install software on a host device 14 is illustrated in block 55.

Figure 6:
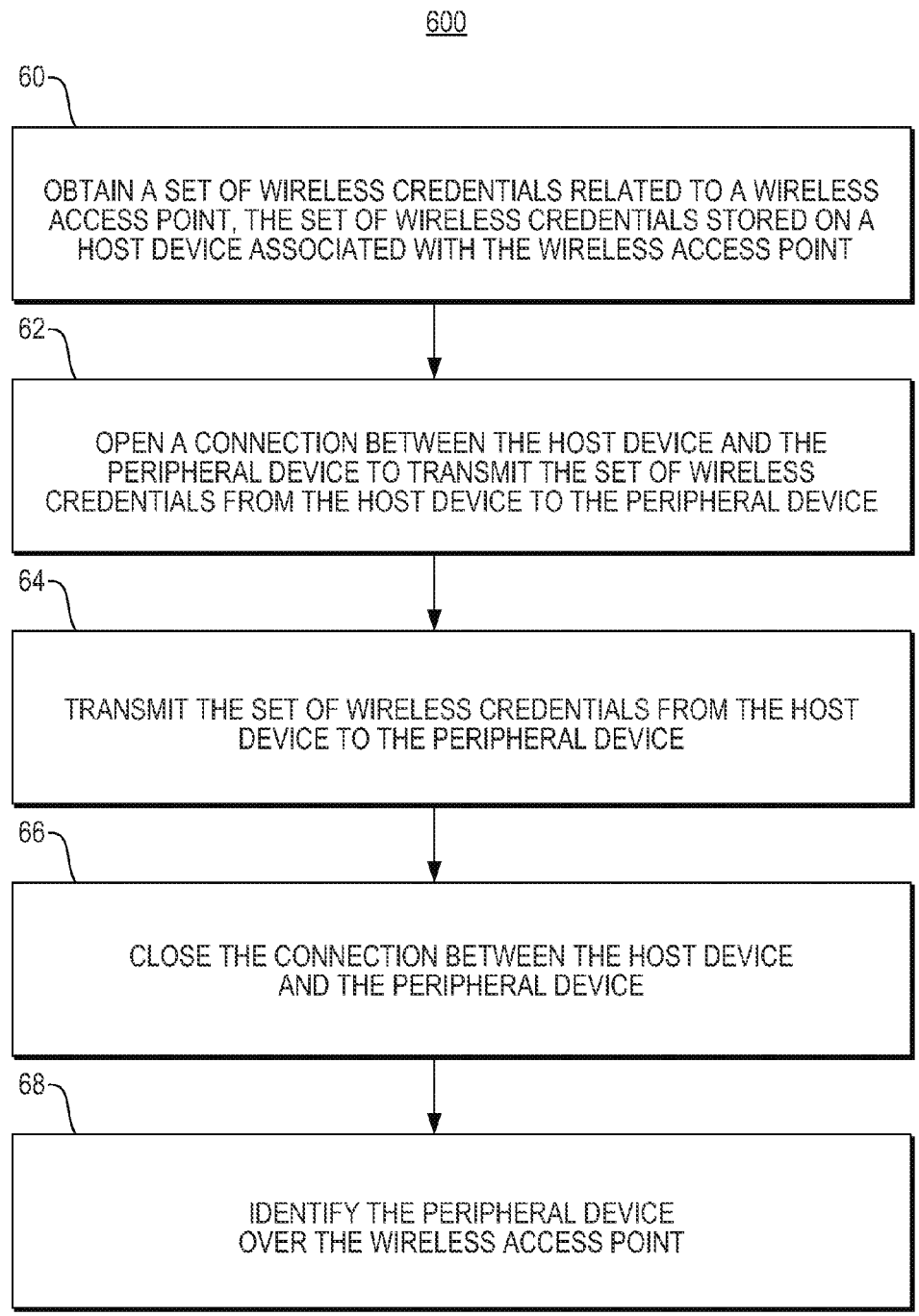
FIG. 6 illustrates a flow chart of a method to connect a peripheral device to a wireless network access point according to an example
Figure 8:
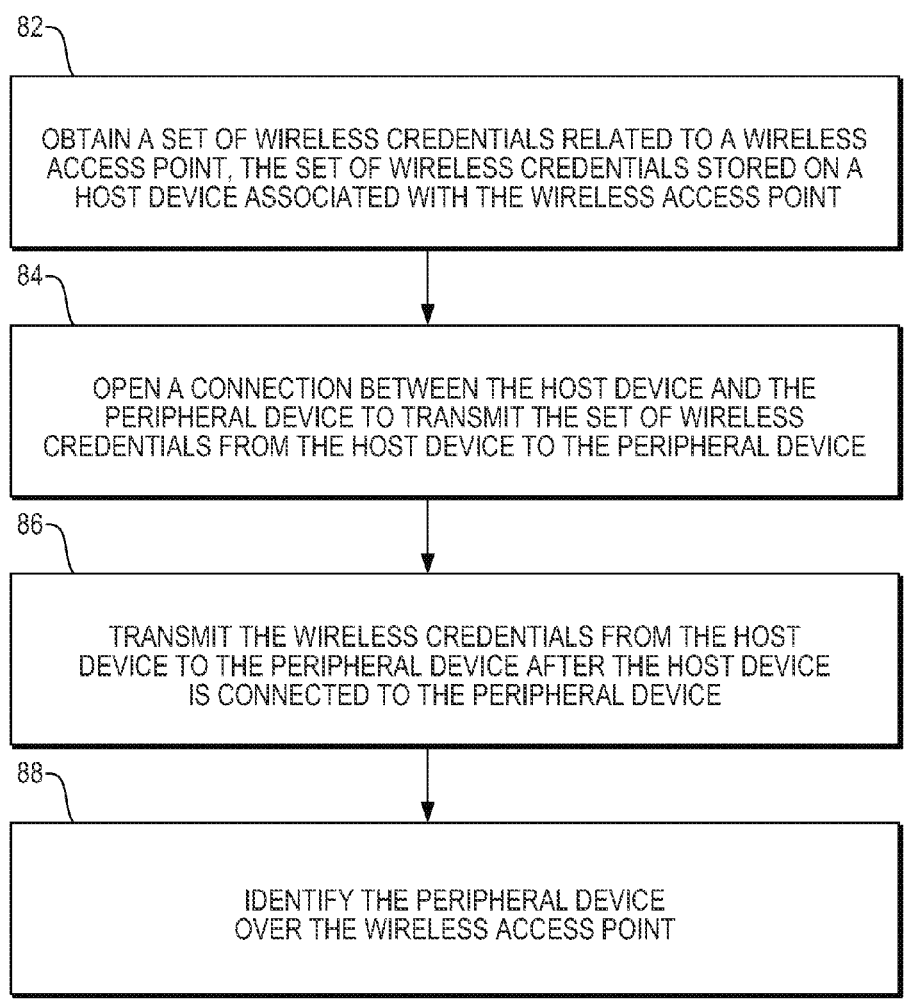
FIG. 8 illustrates a flow chart of a method to connect a peripheral device to a wireless network access point according to an example.

As a result of the installation of the software, the peripheral device 16 is connected to the wireless network access point 12 in block 56, using for example the methods illustrated in the flow charts 600 of FIG. 6 and 800 of FIG. 8. For example, the peripheral device 16 may receive wireless credentials from the host device 14, and the peripheral device 16 automatically enters the wireless credentials to connect the peripheral device 16 to the wireless network. After the peripheral device 16 is connected to the wireless network access point 12, an indication of the successful wireless connection to access point 12 is displayed on the home screen 57 of peripheral device 16 via icons, graphics, and/or textual status messages. The flow chart 500 described illustrates an example of the set-up in a peripheral device 16 that includes a user interface and/or display screen; however, the same set-up similarly occurs in peripheral devices 16 without a user interface and/or display screen.

FIG. 6 illustrates a flow diagram 600 of a method 600 to connect a peripheral device 16 to a wireless network access point 12 according to an example. The method 600 may be used, for example, with the system 100 and apparatus 200. The method 600 may be implemented by the host device 14 during the initial set-up of the peripheral device 16, as described in FIG. 5 between blocks 55 and 56. The method 600 may begin on the host device 14 after an initiation operation in response to activation of installation software thereon.

The method obtains a set of wireless credentials related to a wireless network formed by a wireless network access point 12 in block 60. The set of wireless credentials are stored on a host device 14 associated with the wireless network access point 12. For example, the wireless credentials are stored with the operating system 44 in the memory 24. Prior to the host device 14 obtaining and/or transmitting the set of wireless credentials, approval from a user to obtain the wireless credentials from the host device 14 may be requested.

Figure 7A:
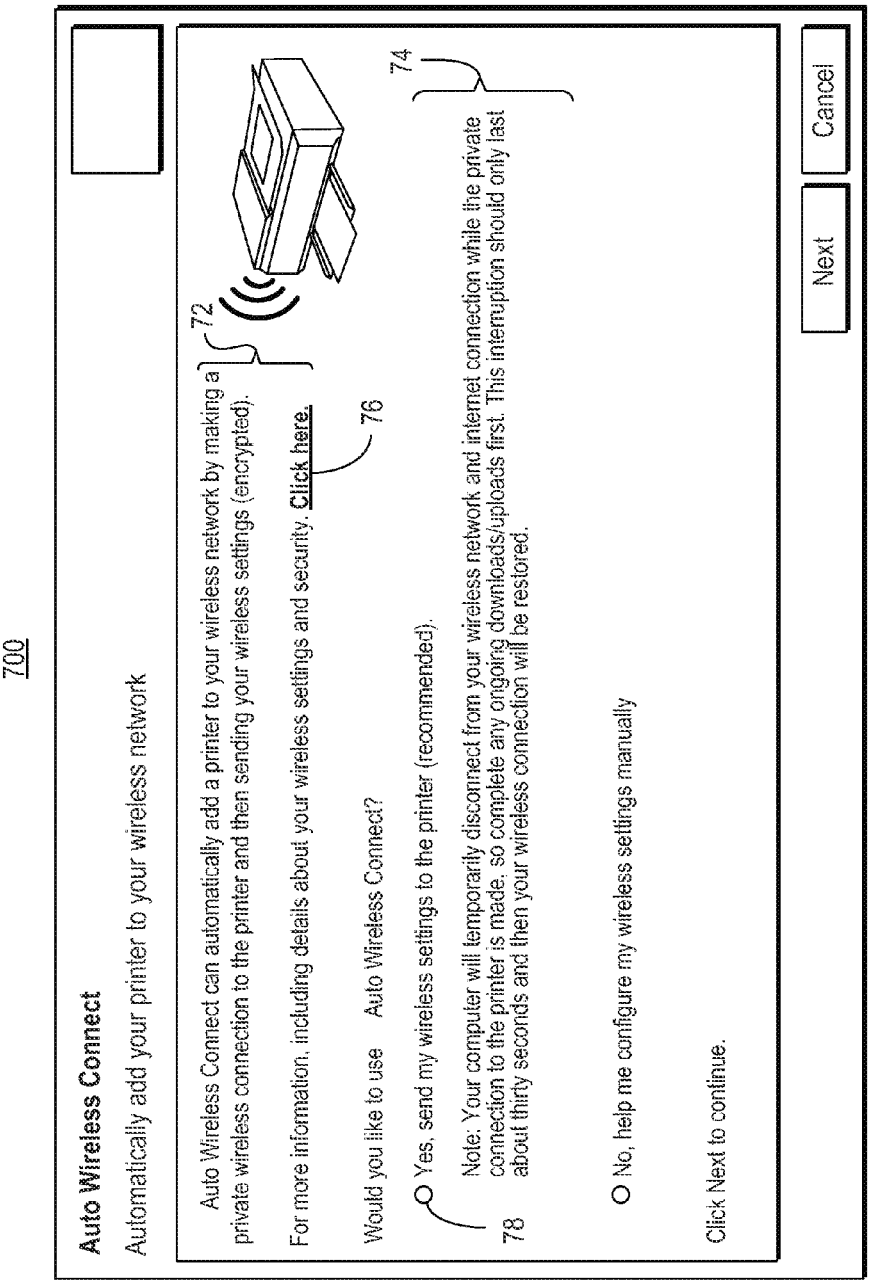
FIG. 7A-B illustrate screen shots of installation screens on an interface according to an example.
Figure 7B:
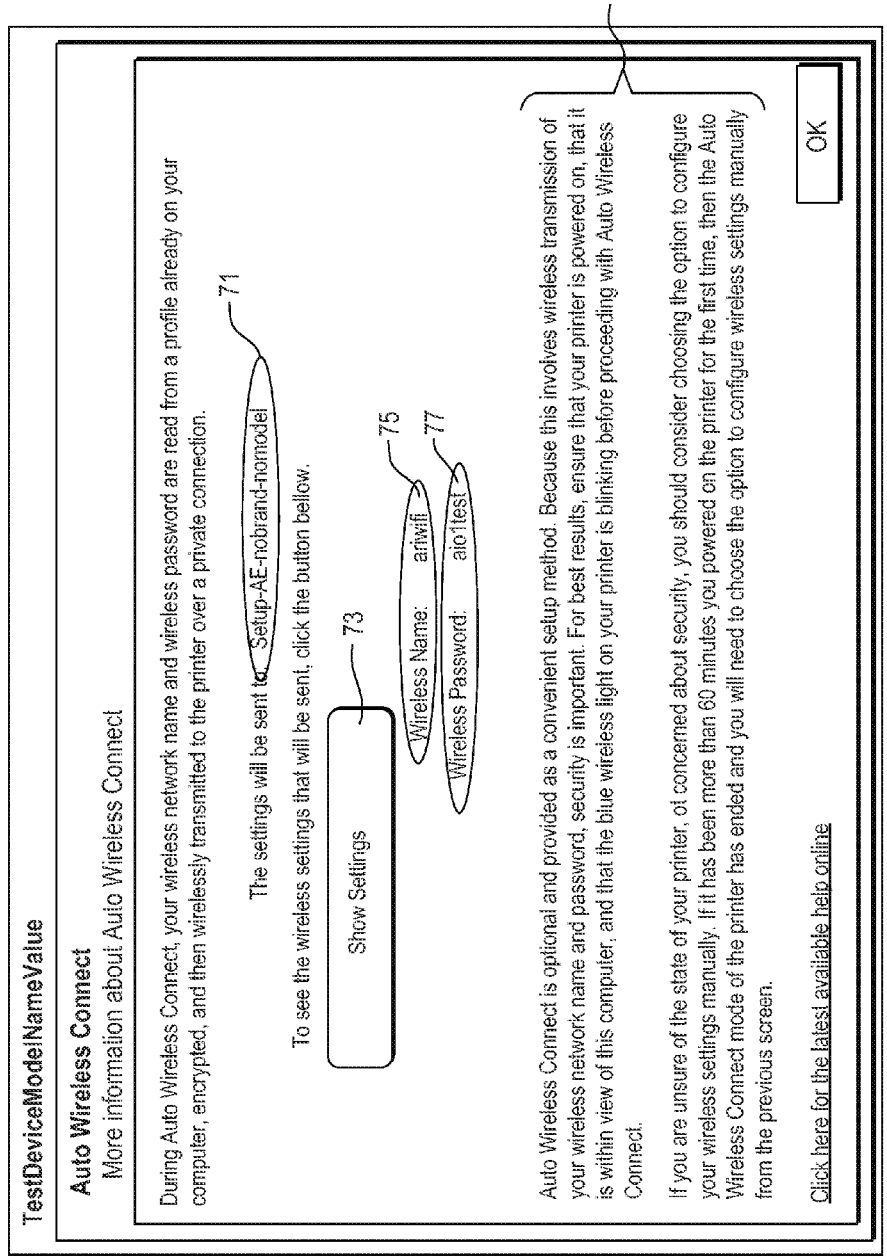

For example, a screen may be displayed on the host device 14 to obtain permission to access wireless network access point 12 information stored on the host device 14. An example screen shot of an initial installation screen 700 on an interface 42 useable with a system is illustrated in FIG. 7A. The screen shot illustrates an initial screen 700 on the host device 14 with information describing automatic wireless connection 72 and allowing the user to choose between connecting the peripheral device 16 automatically or manually 74, Additional details about the wireless settings and security may be accessible via a link 76 on the initial screen 700. For example, the additional details about the wireless settings and security may be provided in a pop-up box on the screen and/or a separate screen 750 as illustrated in FIG. 7B. The additional details may include the settings that are sent to the peripheral device 71, such as "HP-Setup-AE-nobrand-nomodel;" the wireless settings 73; the Wireless Name 75, such as "ariwifi;" the wireless password 77, such as "aio 1 test;" and other details 79 describing the set-up of the automatic wireless connection.

Referring back to FIG. 7A, the user accepts the transmission of the wireless settings to the peripheral device 16 prior to initiating the automated wireless connection of the peripheral device 16. In this case, the wireless settings may be transmitted to the printer after the user selects the Yes option 78 on the initial screen 700; however, additional screens and/or pop-up windows may be used to obtain approval from a user to transmit the wireless settings to a printer and temporarily disconnect from the wireless network that the host device 14 is connected to. This approval may be used for security reasons to ensure that the user approves the extraction and/or transmission of security information regarding the wireless network formed by the wireless network access point 12, such as service set identifier (SSID), encryption type, and network password.

In block 62, the processor 26 opens a connection between the host device 14 and the peripheral device 16. Opening the connection includes establishing a temporary network connection, such as an ad hoc network connection or a temporary-infrastructure connection between the host device 14 and the peripheral device 16. The temporary network connection is used to transmit the set of wireless credentials from the host device 14 to the peripheral device 16, in block 64. After the set of wireless credentials are transmitted, the connection between the host device 14 and the peripheral device 16 is closed in block 66. The peripheral device 16 is automatically configured based on the transmitted wireless credentials and/or additional set-up functions on the peripheral device 16.

Thereafter, the peripheral device 16 joins the network and is identified over the wireless network access point 12 in block 68. The identification of the peripheral device 16 over the wireless network access point 12 includes the host device 14 reconnecting to the wireless network access point 12, performing a scan to find the peripheral device 16, and receiving a peripheral device identifier, such as an internet protocol address or other unique identifier of the peripheral device 16. For example, the host device 14 may receive a peripheral device identifier, and the host device 14 may then map or match the peripheral device identifier to the internet protocol address.

FIG. 8 illustrates a flow diagram 800 of another method to connect a peripheral device 16 to a wireless network formed by a wireless network access point 12 according to an example. The method 800 may be used, for example, with the system 100 and apparatus 200. The method 800 obtains a set of wireless credentials related to a wireless network access point 12. The set of wireless credentials are stored on a host device 14 associated with the wireless network access point 12 in block 82. For example, the wireless credentials may be stored in the operating system 44 of the memory 24 on the host device 14 and the set of wireless credential may include at least one of a SSID of the wireless network access point 12, an encryption type for the wireless network access point 12, and a key for the wireless network access point 12. As discussed with reference to FIGS. 6-7 above, the user may be required to approve access to the set of wireless credentials.

A wireless radio 22 of a host device 14 is configured to connect the host device 14 to the peripheral device 16 in block 84. In order to configure the wireless radio 22 of the host device 14, the host device 14 scans for the peripheral device 16 and creates a temporary network connection, such as an ad hoc network connection or an temporary-infrastructure connection between the host device 14 and the peripheral device 16. After the host device 14 is connected to the peripheral device 16, the wireless credentials are transmitted from the host device 14 to the peripheral device 16 in block 86. The wireless radio 22 of the host device 14 may optionally disconnect from the peripheral device 16.

The peripheral device 16 uses the wireless credentials to perform functions to automatically configure the peripheral device 16 for connection to the wireless network access point 12. Once the peripheral device 16 is configured, the peripheral device 16 is identifiable over the wireless network access point 12, such as a router, in block 88. The peripheral device 16 ray be identified by the host device 14 and/or other devices over the wireless network access point 12 using, for example, the internet protocol address of the peripheral device 16. The identification of the peripheral device 16 over the wireless network access point 12 includes the host device 14 connecting to the wireless network access point 12, performing a scan to find the peripheral device 16, and receiving a peripheral device identifier, such as an internet protocol address or other unique identifier of the peripheral device 16. For example, the host device 14 ray receive a peripheral device identifier, and the host device 14 may then map or match the peripheral device identifier to the internet protocol address.

Although the flow diagram of FIGS. 5, 6, and 8 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present invention.

FIGS. 1-8 aid in illustrating the architecture, functionality, and operation according to examples. The examples illustrate various physical and logical components. The various components illustrated are defined at least in part as programs, programming, or program instructions. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Examples can be realized in any computer-readable media for use by or in connection with an instruction execution system such. as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer-readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be exemplary. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. A method to connect a peripheral device to a wireless network access point, the method comprising:
   obtaining a set of wireless credentials related to a wireless network formed by a wireless network access point, the set of wireless credentials stored on a host device associated with the wireless network access point;
   receiving, in the host device, a service set identifier (SSID) from the peripheral device;
   in response to receiving the SSID from the peripheral device, opening a wireless peer-to-peer network connection between the host device and the peripheral device;
   wirelessly transmitting the set of wireless credentials from the host device to the peripheral device over the peer-to-peer network so that the wireless credentials bypass the wireless access point;
   closing the wireless peer-to-peer network connection between the host device and the peripheral device; and
   identifying the peripheral device over the wireless network access point.

2. The method of claim 1, further comprising receiving an approval prior to obtaining and transmitting the set of wireless credentials.

3. The method of claim 1, further comprising storing the wireless credentials in a memory.

4. The method of claim 1, wherein opening the wireless peer-to-peer network connection includes establishing a temporary network connection between the host device and the peripheral device using the SSID received from the peripheral device.

5. The method of claim 1, wherein the wireless credentials include a Second SSID of the wireless network and wherein identifying the peripheral device over the wireless network access point includes:
   connecting the host device to the wireless network access point;
   performing a scan with the host device to find the peripheral device; and
   receiving, in the host device, a unique identifier of the peripheral device through the wireless network access point, wherein the peripheral device is connected to the wireless network through use of the second SSID.

6. The method of claim 1, further comprising an initiation operation in response to activation of installation software.

7. A product comprising non-transitory computer readable media having stored thereon instructions that, when executed by a processor, cause the processor to perform a method to connect a peripheral device to a wireless network access point, the method including:
   obtaining, with a host device, a set of wireless credentials related to a wireless network formed by the wireless network access point, such that the set of wireless credentials are stored on the host device associated with the wireless network access point;
   receiving, in the host device, a first service set identifier (SSID) from the peripheral device;

configuring a wireless radio of a host device to connect the host device to the peripheral device peer-to-peer network;

transmitting the wireless credentials from the host device to the peripheral device after the host device connects to the peripheral device over the peer-to-peer network so that the wireless credentials bypass the wireless access point, wherein the wireless credentials include a second SSID, wherein the second SSID is of the wireless network; and identifying the peripheral device over the wireless network access point.

8. The product of claim 7, wherein the peripheral device is to communicate with the wireless network access point through use of the second SSID.

9. The product of claim 7, wherein the wireless credentials are stored by the operating system of the host device.

10. The product of claim 7, wherein configuring a wireless radio of the host device to connect to the peripheral device includes:

scanning for the peripheral device with the host device; and creating a temporary network connection between the wireless radio of the host device and a device access point on the peripheral device.

11. The product of claim 7, wherein the wireless credentials include at least one of an encryption type for the wireless network and a key for the wireless network.

12. The product of claim 7, wherein the peripheral device includes one of a printer, a scanner, a multi-function device, a tape drive, a microphone, a loudspeaker, a webcam, a digital camera, a game system, a mobile device, and a mass storage device.

13. The product of claim 7, wherein identifying the peripheral device includes identifying, with the host device, a unique identifier of the peripheral device.

14. The product of claim 7, wherein the method further includes configuring the wireless radio of the host device to reconnect to the wireless network access point after the wireless credentials are transmitted to the peripheral device.

15. An apparatus to connect a peripheral device to a wireless network access point, the apparatus comprising:

a wireless radio on a host device connectable to the wireless network access point and the peripheral device;

a memory to store a set of instructions; and a processor coupled to the wireless radio and the memory, the processor to execute the set of instructions to:

obtain a set of wireless credentials from the host device;

receive, in the host device, a first service set identifier (SSID) from the peripheral device;

in response to receipt of the first SSID, configure the wireless radio to wirelessly connect the host device to the peripheral device over a wireless peer-to-peer network connection;

wirelessly transmit the wireless credentials from the host device to the peripheral device through the wireless peer-to-peer network connection between the host device and the peripheral device that bypasses the wireless network access point; and identify the peripheral device over the wireless network access point.

16. The apparatus of claim 15, wherein the set of instructions configure the wireless radio to reconnect the host device to the wireless network access point after the wireless credentials are transmitted to the peripheral device.

17. The apparatus of claim 15, wherein the wireless network access point comprises a router.

18. The apparatus of claim 15, wherein the memory stores the wireless credentials.

19. The apparatus of claim 15, wherein the peripheral device includes one of a printer, a scanner, a multifunction device, a tape drive, a microphone, a loudspeaker, a webcam, a digital camera, a game system, a mobile device, and a mass storage device.

20. The apparatus of claim 15, wherein the wireless credentials include a second SSID of the wireless network and wherein the processor further executes instructions to:

perform a scan to find the peripheral device; and receive a unique identifier of the peripheral device through the wireless network access point, wherein the peripheral device is connected to the wireless network through use of the second SSID.

* * * * *

UNITED STATES PATENT AND TRADEMARK OFFICE
CERTIFICATE OF CORRECTION

| | |
|---|---|
| PATENT NO. | : 8,966,601 B2 |
| APPLICATION NO. | : 13/271067 |
| DATED | : February 24, 2015 |
| INVENTOR(S) | : Brett A. Green et al. |

It is certified that error appears in the above-identified patent and that said Letters Patent is hereby corrected as shown below:

On the title page item (65), Related U.S. Application Data, in column 1, line 1, delete "61/536,587" and insert -- 61/538,587 --, therefor.

In the claims,
In column 10, line 43, in Claim 5, delete "Second" and insert -- second --, therefor.

Signed and Sealed this
First Day of December, 2015

Michelle K. Lee
*Director of the United States Patent and Trademark Office*